Figure 2:
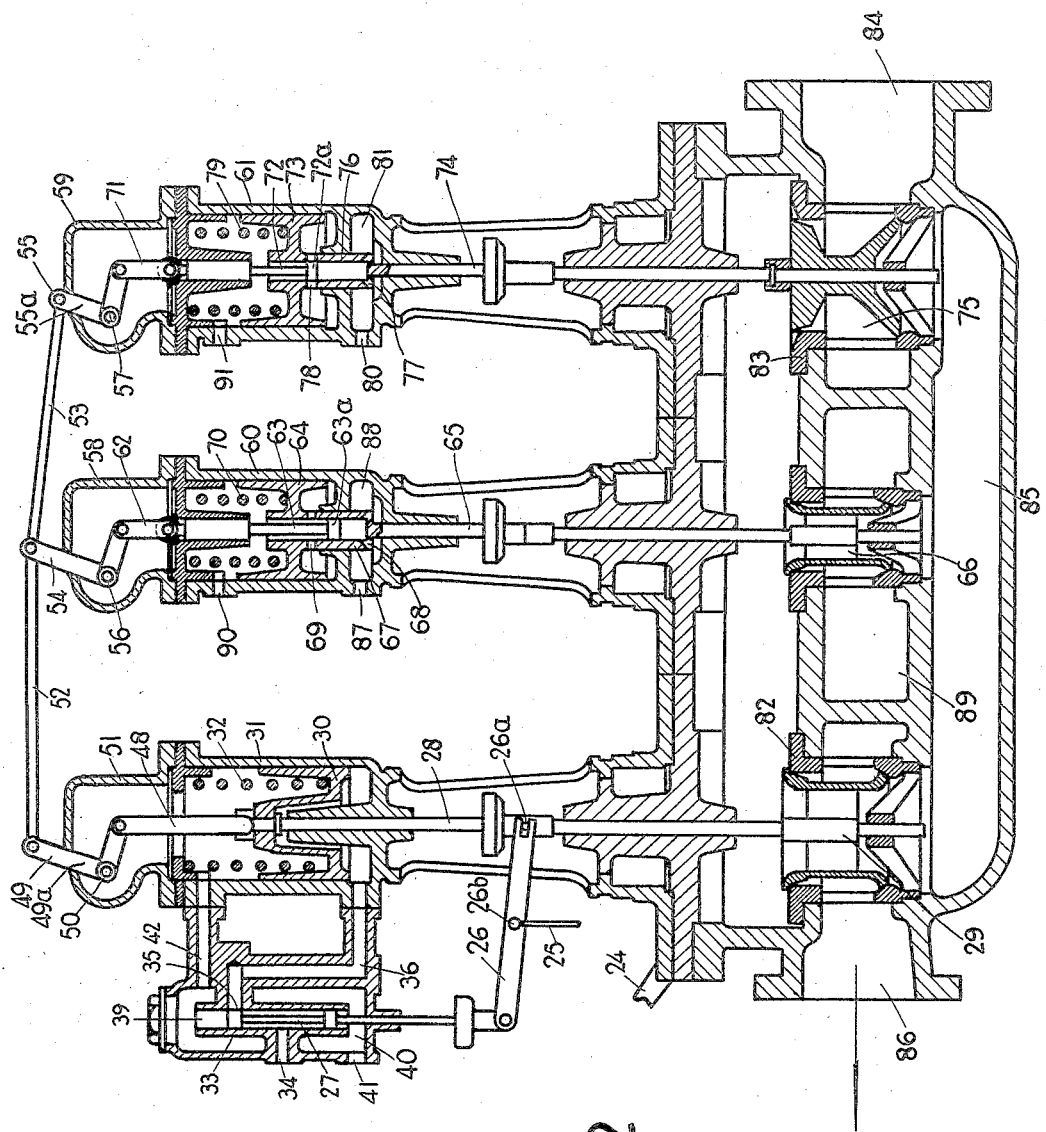

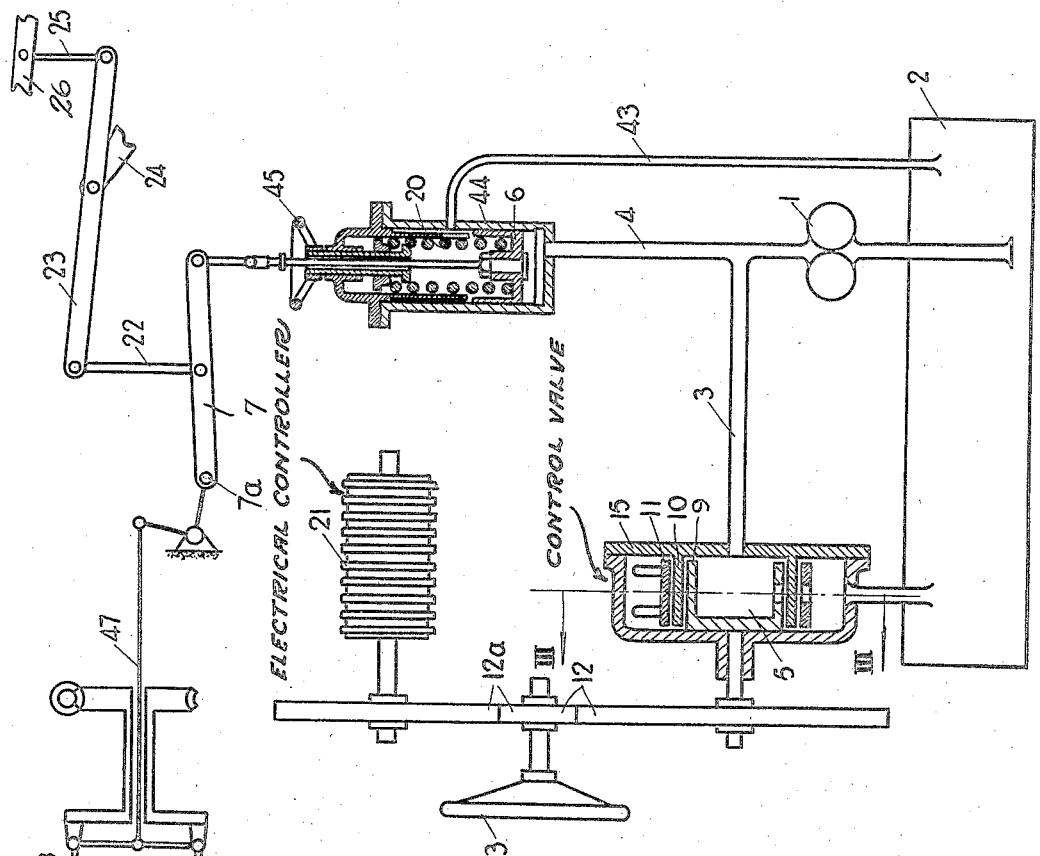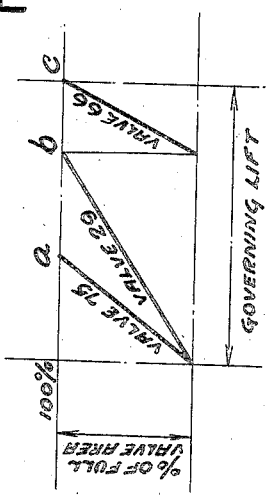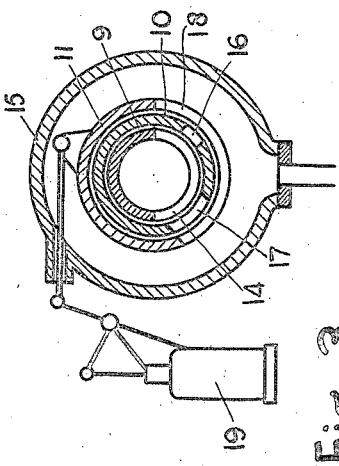

Patented Aug. 27, 1935

2,012,349

UNITED STATES PATENT OFFICE 2,012,349

ELASTIC FLUID TURBINE

Bedrich Pochobradsky, Sidcup, England, assignor to The General Electric Company Limited, London, England Application November 11, 1932, Serial No. 642,228
In Great Britain November 26, 1931

16 Claims. (Cl. 137—158)

This invention relates to the governing of prime movers, one object of the invention being to provide an improved form of governing which may be applied to electrically driven ships. Further objects of the invention will become apparent from the specification.

Where elastic fluid turbines are required to operate over a large range of speed, as is the case with turbines for ship propulsion, difficulties arise in the governing; the turbine should run steadily at any speed within its range of operation, but at slow speeds, the quantity of steam required to drive the turbine is small, and the control of such small quantities of steam, especially at high pressure, is liable to be unsatisfactory with the methods known at present, both on account of the difficulty of controlling the flow of steam and of so arranging the governor that it shall operate satisfactorily over a wide range of speed.

Prior known ship propulsion systems wherein elastic fluid turbines drive the ship through electrical generators and motors are known to utilize controllers for the generators and motors, the controllers being geared to mechanism actuating the throttle valves of the turbines and the controller and throttle valve are adjusted by the same hand wheel; but such control is not satisfactory in that the range of control is limited since there is no control of the governor which controls normal operation of the turbine. For this reason there is a difficulty in ensuring that, in electrically driven vessels, the operation of the electrical gear is properly co-ordinated with that of the governor. Among other objects, the invention is intended to overcome these difficulties.

In one system of electrical ship propulsion in accordance with the invention, there is provided a prime mover, at least one electrical generator driven by said prime mover, at least one electrical motor deriving current from the said generator, and electrical gear is provided for regulating the operation of the motor, while there is a speed responsive governor for the prime mover, means for regulating the normal speed of the governor, and the latter means is interlocked with the electrical control gear. It is thus ensured that the operation of the electrical gear is properly co-ordinated with the operation of the governor. In addition to the governor referred to above, an additional speed responsive means may be provided to limit the speed of the prime mover to a desired value below the maximum permissible speed. This latter speed responsive means may be in the form of a constant speed governor, although it may be simply a speed limiting device: where a constant speed governor is provided for this purpose, it may be arranged to be inoperative at normal speeds and to come into operation only when the highest normal working speed has been exceeded—the highest normal working speed being the speed at which the prime mover runs when the vessel is proceeding at full speed under normal conditions.

The main speed responsive governor may take the form of an hydraulic pump driven by the prime mover, working in conjunction with a device responsive to the pressure generated by the said pump, this latter device being arranged to control the running of the prime mover; and the means for regulating the "speed at which the governor tends to run" may consist of a valve mechanism adapted to vary the relation between the speed of the pump and the pressure produced by the pump at that speed. Where the prime mover drives a plurality of generators, or supplies a plurality of electrical motors, means may be provided to vary the setting of the said valve mechanism in dependence upon the number of generators (or motors, as the case may be) in circuit.

Where the prime mover is a steam turbine, there is, as referred to above, a difficulty in controlling the steam supply when the flow is small; and this difficulty may be overcome by arranging that the steam is throttled twice, when the flow is small, by passing it through two throttle valves in succession.

Arrangements in accordance with the invention will now be described by way of example with reference to the accompanying drawings, in which Figures 1 and 2 show diagrammatically a governor arrangement for a turbo-electric ship drive, and Figure 3 is a section viewed in the direction of the arrow III—III through the control valve used in the arrangement shown in Figure 1, while Figure 4 shows a diagram of the operation of the throttle valves shown in Figure 2.

As shown in Figure 1, the turbine (not shown) drives a pump 1 which sucks a suitable liquid (generally oil) from tank 2 and delivers it through pipes 3 and 4 to the control valve 5 and to the underside of the spring-loaded piston 6. The motion of this piston controls through suitable mechanism the quantity of working fluid passing to the prime mover (as is described in detail below), the piston 6 controlling the admission of steam to the turbine in such a way that the steam admission valve closes when the piston 6 rises. In order to prevent the speed of the prime mover exceeding the highest permissible limit in case of emergency, a centrifugal speed governor 8 (of the usual type) driven by the prime mover is provided; this governor is so adjusted that it begins to exert control just when the highest speed of the normal working range has been exceeded; it is connected through levers (as shown) to one end of a floating lever 7, the other end being connected to the piston 6. Within the normal working range of speed the point 7a is stationary, the prime mover being controlled solely by the piston 6. If the highest speed of the working range is exceeded the governor 8 begins to move the point 7a upwards, thus restricting the admission of steam to the prime mover, as is further described below.

The control valve 5 consists of three concentric sleeves 9, 10 and 11; the inner sleeve 9 can be rotated by means of gearing 12 and a control wheel 13. It is provided with a port 14 extending over a part of its periphery, for example half its periphery as illustrated. The intermediate sleeve 10 is stationary, being attached to the housing 15; it is provided with openings of suitable areas such as the two ports 16 and 17 shown in Figure 3; the outer sleeve 11 is provided with a port 18, and it can be turned by means of a solenoid 19 through a system of levers as shown.

In Figure 3, the control valve 5 is shown in a position when the open valve area is a maximum. By turning the sleeve 9 counterclockwise through 180°, the ports will be covered and the valve is closed. By turning the sleeve 9 from this "closed" position in a clockwise direction through about 45° the port 16 is uncovered, and a further turn through 45° still leaves port 16 alone uncovered, the open valve area remaining constant during this second turn of 45°. A further rotation of the sleeve through 90° gradually uncovers the port 17 in addition to the port 16; while, finally, the valve position illustrated in Figure 3 being reached, the control valve 5 is full open. The handwheel 13 also controls, by means of gearing 12a, the electrical control gear for the generators and motors deriving power from the prime mover. This control gear is represented diagrammatically at 21.

The governor arrangement just described is suitable for the control of a turbine which drives a plurality of generators, or a single generator supplying a plurality of electric motors. The solenoid 19 is arranged to be energized if a generator, or a motor, as the case may be, is cut out of service, and when energized, the solenoid 19 rotates the sleeve 11 in a counterclockwise direction (as viewed in Figure 3), partially closing port 17 and thus reducing the opening of the valve 5.

The piston 6 is connected, as aforesaid, to the floating link 7, which is in turn connected by the link 22 and the lever 23 (which is pivoted on bracket 24) and the link 25 to the floating lever 26 of the pilot valve 27, (Figure 2) the end of the lever 26 which is remote from valve 27 being connected (in known manner) to valve spindle 28, which carries the turbine throttle valve 29 at its lower end and at its upper end carries power piston 30 which works in cylinder 31 and is loaded by spring 32. Valve 27 works in a sleeve 33 provided with an inlet port 34 for oil under pressure, and an outlet port 35 communicating through passage 36 with the underside of piston 30.

This mechanism, as is known, provides a follow-up arrangement by which the position of the valve 29 may be accurately determined in dependence upon the position of the lever 23 and thus, ultimately, upon the position of piston 6.

It will be seen that, if piston 6 falls owing to a decrease in the speed of the turbine or to the opening of valve 5, (so that there is a call for a supply of steam to the turbine), the end 23a of lever 23 rises and raises floating lever 26, thus raising valve 27 and opening port 35. This permits oil to flow from inlet 34 through passage 36 to the underside of piston 30, thereby raising it. As piston 30 rises, it opens valve 29, thereby allowing more steam to flow from the inlet 85 to the branch 86 which is connected to the turbine. The rise in the piston 30 also has the effect of raising spindle 28 and with it the end 26a of lever 26, so that valve 27 is once more lowered until it closes port 35. If, on the contrary, the turbine speed rises or valve 5 is closed, piston 6 rises, lever 26 falls, thus lowering valve 27, and connection is established between passage 36 and the open upper end 39 of sleeve 33, through the open port 35, so that oil can flow from under piston 30, through passage 36 and port 35 to chamber 40 and oil drain 41. Piston 30 then falls, closing valve 29 somewhat, and at the same time raising valve 27 until port 35 is once more closed and the movement ceases.

It will be noted that an oil drain and air release 42 is provided from the top of cylinder 31 to chamber 40, and a similar connection 43 is provided from the top of cylinder 44 (Figure 1) in which works piston 6. In addition, an adjusting wheel 45 is provided on cylinder 44 so that the compression of spring 20 may be varied, thus regulating the oil pressure required to lift piston 6 and hence adjusting the turbine speed.

As referred to above, a governor 8 is provided to take charge of the turbine on overspeed. It will be seen that when the speed increases sufficiently to cause the bob-weights 46 to move outwards, the spindle 47 is retracted, raising link 22 and lowering link 25 and valve 27. As explained above, this causes valve 29 to be closed somewhat, thus preventing excessive overspeeding.

The operating of the interlocking part of the new governing gear will now be described in detail, the description of the mode of operation of the throttle valves being described later.

The speed of the pump 1, driven by the prime-mover, will be in constant ratio to the speed of the prime-mover. In increasing the speed of the prime-mover and consequently of the pump the output of the pump will increase, and if a gear type of pump is used the quantity of liquid delivered will increase directly as the speed (approximately). If the open area of the control valve 5 is varied in the same degree as the speed, the pressure in the pipes 3 and 4 and underneath the piston 6 will remain practically unchanged, the piston 6 remaining substantially in the same position. Assume the control valve 5 closed; for a certain lowest speed the pump 1 will deliver a quantity just sufficient to supply the leakage in the control valve 5 and around the piston 6, the pressure being just sufficient to lift the piston 6 to its maximum height, which practically closes the organs for the admission of the working fluid to the prime-mover. By rotating the wheel 13 through a small angle, (and with it the sleeve 9) thus opening slightly the control valve, more liquid will pass through this valve and drain to the tank 2, so that the pressure in the pipes 3 and 4 and underneath the piston 6 will fall slightly; the piston 6 will then move downwards a little and increase the admission of working fluid to the prime-mover, the speed of the latter being increased.

By further increasing the open area of the valve 5 the speed of the prime-mover will be further increased. Assume that load is now put on the prime-mover while it is running at a given speed. This loading will slow down the prime-mover, the pump 1 will deliver less liquid, the pressure underneath the piston 6 will fall, the piston 6 will move downwards and so increase the admission of working fluid to the prime-mover. The spring 20, which tends to thrust the piston 6 to its lowest position, is so dimensioned that, when full load is thrown on the prime-mover, when it is running at its normal speed, the speed reduction is within, say 5%. This speed reduction is sufficient for the pressure underneath the piston 6 to fall (the open area of the valve 5 remaining unaltered) to its lowest position, the admission of the working fluid to the prime-mover being increased to its maximum. It is clear that for a definite open area of the valve 5 the speed of the prime-mover will be maintained constant within a few percent with the load varying within the full range.

In order to provide the interlocking of the turbine control with the electrical control gear, the handwheel 13 is connected, as referred to above, through gearing 12a with a suitable controller 21 which is provided with contacts of suitable length in the appropriate positions for making or breaking electric circuits, in the course of rotation of the controller. The ratio of the gearing 12a is such that all switching operations are performed and contacts necessary for running maintained when the controller turns through, say 240°. In the construction illustrated, when the control wheel 13 turns through 180°, the sleeve 9 of the control valve 5 rotates through 45°, and the controller rotates through 60°.

When starting up, the prime-mover with its electric alternator is run up to some low speed at which the pump 1 delivers a quantity of liquid (with the control valve 5 in "closed" position) sufficient to control the speed of the prime-mover, which may be say 1/10 of full speed, the electrical switch gear being in the open position. The control of direction is now set for ahead or astern going, as desired. By turning the handwheel 13 through 180°, the direction contactors of the propulsion motors are closed, the port 16 of the valve 5 is gradually opened the speed of the prime-mover increasing to, say, 1/5 of full speed, the altenator fields are over excited and the propulsion motors are brought up to a speed corresponding to the actual speed of the prime-mover. By turning the handwheel 13 through another 90°, the actuation of the controller 21 causes the motor fields to become excited, and the motors to pull into synchronism, the sleeve 9 of control valve 5 meanwhile turning through another 22½° which does not open any additional port so that the speed of the prime-mover and alernator remains unaffected. By turning the handwheel 13 through a further 90°, the open area of valve 5 remains unaltered and the alternator fields are reduced to normal. The handwheel 13 may now be turned by any fraction of an additional complete turn in the same direction as before, the sleeve 9 of the valve 5 accordingly turning within the additional angle 90°, and the port 17 being more or less uncovered so that the speed of the prime-mover is more or less increased accordingly, the highest speed being obtained when the control wheel 13 has performed two full turns.

By turning the handwheel 13 in the opposite direction from this extreme position through two full turns, the plant is brought into the original condition which existed at starting up, just before the handwheel 13 was moved from its zero position.

The arrangement and control of the throttle valves for the turbine will now be described.

It will be seen from Figure 2, the piston 30 carries a link 48 connected to a bell crank 49 pivoted at 50 in the cap 51 of cylinder 31. The bell crank 49 is connected by links 52 and 53 with bell cranks 54 and 55 pivoted at 56 and 57, respectively, in the caps 58 and 59 of additional power cylinders 60 and 61. Bell crank 54 is connected by link 62 to the pilot valve 63 for piston 64 which is in turn connected by valve spindle 65 to throttle valve 66.

The pilot valve 63 works in a sleeve 67 which is mounted on the end of spindle 65 and is provided with oil inlet passages 68 and oil outlet ports 69. The piston 64 is biased towards the bottom of cylinder 60 by spring 70.

The arrangement for the control of the relay cylinder 61 and associated gear is similar. Bell crank 55 is connected by link 71 to the pilot valve 72 for piston 73, which is in turn connected by valve spindle 74 to throttle valve 75. The pilot valve 72 works in a sleeve 76 which is mounted on the upper end of spindle 74 and is provided with oil inlet passages 77 and outlet ports 78. The piston 73 is biased towards the bottom of cylinder 61 by spring 79.

With this arrangement of throttle valves, if pilot valve 27 is raised so that communication is established between oil inlet 34, port 35, passage 36 and the underside of piston 39, causing it to rise (as described above), the rising of piston 39 raises link 48, and causes bell cranks 49, 54 and 55 to turn in a counter-clockwise direction as viewed in Figure 2. This raises pilot valve 72 and its head 72a uncovers port 78, so that communication is established between pressure oil inlet 80, chamber 81, passages 77, port 78 and the underside of piston 73. The pistons 39 and 73 accordingly rise together and throttle valves 29 and 75 open simultaneously, piston 73 rising until its motion causes ports 78 to become closed once more.

The valves 29 and 75 being lifted off their respective seats 82 and 83, steam flows from inlet 84 through valve 75 into valve chest 85 and then through valve 29 to the outlet branch 86 whence it passes to the turbine. It will be seen that the steam flowing to the turbine is thus twice throttled, and this permits the flow of small quantities of steam to be regulated accurately and with certainty, which is very desirable for the satisfactory control at low loads of marine turbines for electric propulsion. As the valves are lifted further and further from their seats the steam flow increases, double throttling is, however, no longer necessary, and for this reason, the arm 49a of bell crank 49 is made longer than the arm 55a of bell crank 55, so that pilot valve 72 rises more rapidly than does piston 30; accordingly valve 75 opens more rapidly than valve 29, and the throttling effect it exerts on the steam also decreases more rapidly, until, when the steam flow is of such amount that it can conveniently be controlled by a single valve, valve 75 has reached the "full open" position (i. e. the position at which further opening produces no appreciable increase in steam flow), the whole of the control being exerted by valve 29.

If the piston 30 continues to rise after valve 75

75 has reached the full open position, the pilot valve 63 is raised further and further until its head 63a covers ports 69 just as valve 29 reaches its full open position. (It will be understood that the valves 29 and 75 and their seatings 82 and 83 must be given a suitable conformation, the method of designing such valves being well-known in the art). If now, further load be put on the turbine, or control valve 5 is opened further, pilot valve 27 again admits oil to cylinder 31, raising piston 30 and with it pilot valve 63, and the head 63a now uncovers ports 69, establishing communication between pressure oil inlet 87, chamber 88, passages 68, ports 69 and the underside of piston 64. The latter accordingly rises, opening valve 66, and admitting steam from valve chest 85 to the outlet 89 connected to the overload nozzles of the turbine.

If the speed of the turbine rises, or the control valve 5 is closed, the reverse series of operations is performed. Valve 63 is lowered, permitting oil to flow from the underside of piston 64 through ports 69 and the open upper end of sleeve 67 to the upper part of cylinder 60 and thus to drain 90. A similar drain 91 is provided on cylinder 61.

The mode of operation of the governor is illustrated graphically in Figure 4, in which the lines marked "Valve 29", "Valve 66" indicate the proportion of their total areas which each of the valves presents for the passage of steam for various positions of the lever 26 (the amount by which the point 26b has moved away from the position which it assumes when all the valves are closed, is referred to in Figure 4 as the "governing lift"). It will be seen that since the valve 75 rises from its seat more rapidly than does the valve 29, as point 26b moves away from the "closed" position—which is the position shown in Figure 2—valve 75 reaches its full open position before valve 29 does so; and, as explained above, the rates of lift are so adjusted that valve 75 reaches its full open position (indicated by point $a$ in Figure 4) at a time when the quantity of steam passing the valves is large enough to be properly controlled by valve 29 alone. Similarly, when valve 29 has reached its full open position $b$ (in Figure 4, valve 66 starts to open.

It will be understood that more than one overload valve such as 66 may be employed, and that the valve 66, and any other overload valves, may receive steam direct from the steam main, instead of receiving steam that has already passed through a throttle valve such as 75.

Moreover, the rates of opening of valves 29 and 75 may be made the same, so that both perform a throttling action over the same range: the important point in regard to this double valve arrangement, is that both valves should produce a throttling action over that part of the range in which the steam flow is too small to be regulated with sufficient accuracy by a single valve.

It will also be appreciated that the interlocked control and governing arrangement, as shown in Figures 1 and 2 may readily be adapted for the control of an internal combustion engine. The link 25 would, in this case, instead of being connected to the floating lever 26 of the relay gear, be connected to the organ controlling the supply of fuel to the engine; for example, it might regulate in known manner the operation of the fuel injection valve of a Diesel engine.

By the use of the interlocked governor in accordance with the present invention, the control of an electrically propelled vessel may be greatly simplified. The speed responsive governor controls the prime-mover in such a way that its speed has a predetermined value suitable for each switching operation made by the electrical control gear, and such speed is set by the motion of the switch apparatus itself; further, on completion of switching operations the governor can be set for any speed between the switching speed and maximum working speed. Finally, a certain speed limit is imposed by the governor on the prime-mover when an electric generator or motor is cut out of operation, this speed limit being such as to prevent the remaining electrical machines being overloaded.

I claim:—

1. In an elastic fluid turbine installation, adapted to work over a large range of quantities of elastic fluid, an elastic fluid turbine, a load driven by said turbine, an hydraulic pump driven by said turbine, a pressure-sensitive device comprising a cylinder and a spring-loaded piston therein subject to the pressure of the fluid delivered by said pump, manually operated valve means for regulating the pressure on said piston by controlling the escape of fluid between said pump and said piston, means operating in dependence on the position of the piston in said cylinder for regulating the flow of elastic fluid into the turbine and a control member independently operable for controlling the extent to which said valve is opened.

2. In an elastic fluid turbine installation, adapted to work over a large range of quantities of elastic fluid, an elastic fluid turbine, a load driven by said turbine, an hydraulic pump driven by said turbine, a pressure-sensitive device comprising a cylinder and a spring-loaded piston therein subject to the pressure of the fluid delivered by said pump, manually operated valve means for controlling the pressure transmitted by said fluid to said piston, a control member independently operable for controlling the extent to which said valve is opened, at least one throttle valve for controlling the supply of elastic fluid to said turbine and an hydraulic relay for operating said throttle valve and regulating the position in dependence upon the position of said piston.

3. In an elastic fluid turbine installation adapted to work over a large range of quantities of elastic fluid, an elastic fluid turbine, a load driven by said turbine, an hydraulic pump driven by said turbine, a pressure-sensitive device comprising a cylinder and a spring-loaded piston therein subject to the pressure of the fluid delivered by said pump, manually operated valve means for controlling the pressure transmitted by said pump through said fluid to said piston, a control member independently operable for controlling the extent to which said valve is opened, at least two throttle valves through which the elastic fluid supplied to said turbine passes in succession, and relay means controlled by said pressure-sensitive device for regulating the positions of the respective throttle valves in dependence upon the position of said piston.

4. In an elastic fluid turbine installation adapted to operate over a large range of quantities of elastic fluid, an elastic fluid turbine, a load driven by said turbine, an hydraulic pump driven by said turbine, regulating means for said turbine comprising a pressure-sensitive device operated by fluid from said pump, and valve means for regulating the speed-pressure characteristic of said pump comprising a control valve having at least two concentric sleeves provided with suitable openings, manually operable means for controlling the movement of one of said sleeves and independently operable means for moving another of said sleeves.

5. In an elastic fluid turbine installation adapted to work over a wide range of quantities of elastic fluid, an elastic fluid turbine, a load driven by said turbine, a speed-responsive governor for said turbine, at least two throttle valves for controlling the passage of the elastic fluid to the turbine, the elastic fluid passing through said valves in succession, means operated by said governor for controlling operation of said throttle valves in prearranged sequence and control means for adjusting the operating range of said governor to thereby regulate the normal speed of the turbine within the range selected.

6. In an elastic fluid turbine installation adapted to work over a wide range of quantities of elastic fluid, an elastic fluid turbine, a load driven by said turbine, a plurality of throttle valves, a fluid pressure pump driven by said turbine, control means for regulating the effective pressure delivered by said pump, speed governing means responsive to the effective pressure delivered by said pump and means controlled by said governing means for operating at least two of said throttle valves through which the elastic fluid for operating the turbine is required to pass in succession.

7. In an elastic fluid turbine installation adapted to work over a wide range of quantities of elastic fluid, an elastic fluid turbine, a load driven by said turbine, a fluid pressure pump driven by said turbine, a fluid pressure sensitive device comprising a cylinder and a spring-loaded piston therein arranged to control the speed of the turbine according to the effective fluid pressure delivered by said pump, control means for varying the effective pressure on said piston by controlling the escape of fluid between said pump and said piston, at least two throttle valves through which the elastic fluid for operating the turbine is required to pass in succession and pilot valve operated means controlled by said pressure sensitive piston for controlling operation of the respective throttle valves according to the speed of the turbine.

8. In an elastic fluid turbine installation adapted to work over a wide range of quantities of elastic fluid, an elastic fluid turbine, a load driven by said turbine, a fluid pressure pump driven by the turbine, a pressure-sensitive device subject to the pressure of the fluid delivered by said pump, control valve means for controlling the fluid pressure transmitted to said pressure-sensitive device, at least two throttle valves through which the elastic fluid for operating the turbine is required to pass in succession, means controlled by said pressure-sensitive device to cause one of said throttle valves to open in dependence upon the pressure transmitted to said sensitive device, and means controlled by the opening of the first throttle valve to cause the opening of another of said throttle valves.

9. In an elastic fluid turbine installation, adapted to work over a large range of quantities of elastic fluid, an elastic fluid turbine, a load driven by said turbine, a fluid pressure pump driven by said turbine, control means for regulating the effective fluid pressure of said pump, means responsive to the effective fluid pressure delivered by said pump and arranged to be regulated by said last named means, a plurality of throttle valves controlling admission of elastic fluid to the turbine and means operatively connected with said pressure-responsive means for operating said throttle valves in succession for controlling said turbine, one of said throttle valves being brought into operation only upon overload of the turbine.

10. In an elastic fluid turbine installation, adapted to work over a wide range of quantities of elastic fluid, an elastic fluid turbine, a load driven by said turbine, a fluid pressure pump driven by said turbine, a control valve for regulating the effective fluid pressure delivered by said pump, a plurality of throttle valves for regulating the flow of elastic fluid to said turbine, means comprising a pressure-sensitive device responsive to the effective fluid pressure from said pump, as determined by said control valve, for operating at least two of said throttle valves substantially simultaneously, said two valves being so arranged that elastic fluid to the turbine is required to pass through them in succession, and means controlled by said pressure-sensitive device for opening a third throttle valve upon overload of the turbine.

11. In an elastic fluid turbine installation, adapted to work over a large range of quantities of elastic fluid, an elastic fluid turbine, a load driven by said turbine, a fluid pressure pump driven by said turbine, a pressure-sensitive device comprising a cylinder and a spring-loaded piston therein subject to the pressure of the fluid delivered by said pump, a control valve for controlling the effective fluid pressure on said piston, a plurality of throttle valves at least one of which is arranged for controlling the supply of elastic fluid to said turbine under normal operating conditions, pilot valve operating means for said normal operating throttle valve arranged to regulate the position thereof in dependence upon the position of said piston, and means controlled by said normal operating throttle valve for bringing into operation another of said throttle valves upon overload of the turbine.

12. In an elastic fluid turbine installation in accordance with claim 8, an auxiliary constant-speed governor set to take control of the speed of the turbine only when and if the speed of the turbine exceeds a prearranged highest normal working speed by a determinate amount and means brought into action by said auxiliary governor for operating said throttle valves to prevent the speed of the turbine exceeding the prearranged highest value.

13. In an elastic fluid turbine installation in accordance with claim 8, an auxiliary constant-speed governor connected and arranged to control operation of said plurality of throttle valves only when and if the speed of the turbine should exceed its normal speed while under control of said pressure sensitive device by a determinate amount and means brought into action through operation of said governor to prevent the speed from rising to a higher value.

14. In an elastic fluid turbine installation adapted to work over a large range of quantities of elastic fluid, an elastic fluid turbine, a load driven by said turbine, a fluid pressure pump driven by said turbine, a pressure-sensitive device comprising a cylinder and a spring-loaded piston therein subject to pressure of the fluid delivered by said pump, a rotatable control valve for regulating the effective fluid pressure on said piston by controlling the escape of fluid between the pump and said piston, at least one throttle valve for controlling the supply of elastic fluid to the turbine, means controlled by said pressure-sensitive device for regulating the position of said throttle valve in dependence upon the position of the piston in said cylinder, a control hand wheel for the turbine and gearing between said hand wheel and said control valve for rotating the latter to vary the fluid pressure on said piston.

15. In an elastic fluid turbine installation adapted to operate over a large range of quantities of elastic fluid, an elastic fluid turbine, a load driven by said turbine, a fluid pressure pump driven by said turbine, regulating means for said turbine comprising a pressure-sensitive device operated by fluid from said pump, a control valve having at least one rotatable member for regulating the speed-pressure characteristic of said pump relative to said pressure-sensitive device, a hand wheel for controlling the turbine and gearing connections between said hand wheel and said rotatable member for rotating the latter to vary said speed-pressure characteristic.

16. In an elastic fluid turbine installation in accordance with claim 15, wherein said control valve is provided with another rotatable member which is rotatable independently of said hand wheel to vary said speed-pressure characteristic.

BEDRICH POCHOBRADSKY.